United States Patent

Hermans et al.

[11] Patent Number: 5,915,885
[45] Date of Patent: Jun. 29, 1999

[54] METHOD FOR VERTICAL DISPLACEMENT OF MASSES UNDERNEATH THE EARTH'S SURFACE

[75] Inventors: Philip L. Hermans, Antwerpen, Belgium; Ronald W. Van Oostrum, Zoetermeer, Netherlands

[73] Assignee: Dredging International N.V., Zwijndrecht, Belgium

[21] Appl. No.: 08/797,161

[22] Filed: Feb. 10, 1997

[51] Int. Cl.⁶ .................................. B09B 1/00; E02D 3/12
[52] U.S. Cl. ........................... 405/258; 405/128; 405/269
[58] Field of Search .................. 405/52, 53, 55, 405/128, 258, 269; 299/4, 5

[56] References Cited

U.S. PATENT DOCUMENTS

| | | | |
|---|---|---|---|
| 2,627,169 | 2/1953 | Poulter . | |
| 3,375,666 | 4/1968 | Sutton | 405/128 X |
| 3,852,967 | 12/1974 | Stewart et al. | 405/128 |
| 4,072,017 | 2/1978 | Shiraki | 405/270 |
| 4,643,617 | 2/1987 | Kanno et al. . | |
| 4,662,792 | 5/1987 | Gessay | 405/269 X |
| 4,697,954 | 10/1987 | Grund | 405/128 |
| 5,503,501 | 4/1996 | Kunito | 405/269 X |

FOREIGN PATENT DOCUMENTS 39 01 920  8/1989  Germany .

Primary Examiner—George Suchfield
Attorney, Agent, or Firm—Banner & Witcoff, Ltd.

[57] ABSTRACT

A method for the displacement of mass A underneath the earth's surface and underneath a soil mass C to site B where the first step optionally treats mass A by known methods such that the composition of mass A is physically altered, mass A is then inserted underneath the earth's surface and soil mass C, displacing soil mass C vertically upwards, and optionally displacing a soil mass D, positioned under site B, vertically downwards.

10 Claims, 2 Drawing Sheets

METHOD FOR VERTICAL DISPLACEMENT OF MASSES UNDERNEATH THE EARTH'S SURFACE

BACKGROUND OF THE INVENTION

The invention relates to a method for the displacement of masses, in particular soil masses, underneath the earth's surface.

Such a method is in general known, in particular for the dumping of polluted materials or for the storage of undesired materials in a natural cavity or artificially created cavity, which is suitable for the reception of such materials.

In the state of the art several techniques are known for this deposition under high pressure.

The German publication 39.01.920 describes a device for the transport under a high-pressure of unwanted materials under the earth's surface.

This high pressure can result in the expansion of the existing materials with the resultant upliftment of the surface. This upliftment of the possible creation of failure seams are extremely difficult and expansive to predict or control. Further difficulties in this application are that these unwanted materials have to be transported over a considerable horizontal distance before they can be inserted. This causes considerable costs and environmental burden.

In the oil exploitation sector it is also known that residual products are returned under pressure to their original place by means of the already available oilpump, said pump having been used previously for the extraction of the oil.

These known methods rely on the creation of a free space underneath the earth's surface in order to fill it up with the undesired substance.

These spaces underneath the earth's surface are rather limited or difficult to access and often not available for the mentioned purposes due to for example rock formations or other soil layers difficult to penetrate.

It is obvious that if it is necessary to create a cavity in order to fill it up, extra costs and great delays are involved.

The object of the invention is to omit these drawbacks.

SUMMARY OF THE INVENTION

For reasons of clarity in the description and in the claims of the invention mass A will be referred to as the mass which has to be moved away from its original place and which has to be inserted underneath the earth's surface in a particular site. This site will be referred to as site B. Site B is positioned underneath a soil mass D and above a soil mass C.

In this manner the invention provides a method for the displacement of a mass A under the earth's surface and underneath a soil mass C to site B, said method is characterized in that, the soil mass C is mainly transported vertically upwards.

In another method according to the invention the displacement of mass A to site B will cause a vertically downwards movement of mass D.

It is a further objective to provide a method wherein mass A will be stabilized when inserted in site B. According to the invention a method is provided wherein mass A will be mixed with soil mass C or/and soil mass D when inserted due to a mixing device or due to the pressure and the kinetic energy of mass A.

This provides a solution to the above mentioned difficulties and also provides as alternative means using techniques already developed and patented by the applicant. This technique has the ability to distribute the disposal materials, treated or untreated for example below the seabed and by careful use of the mixing device the high pressure energy is dissipated into the mixing process and it is not required to create a cavity. The benefit of this is that gradual controlled upliftment occurs and no failure seams can occur.

It is another object of the invention to shift a mass A which is lying on the earth's surface above soil masses C and D. The vertical displacement of mass A will cause an upliftment of soil mass C. The soil mass C, due to this displacement, can provide better surface characteristics and can therefore be suitable as a foundation for buildings, pavement, etc.

These methods according to the invention can be applied to many kinds of soils where there are no severe geological or/and geophysical restrictions.

In a preferred embodiment of the method according to the invention it is possible to change the composition of mass A. The composition of mass A can be changed to any desired composition, for example for stabilization or for compacting the soil. An example is to make a mixture of mass A and other soil components such as sand or clay, or even an addition of a previously produced stabilisator, such as cement and possibly some water.

Another advantage of the method according to the invention is the applicability of the method not only onshore but also off-shore. A preferred embodiment of a method according to the invention is the application in a marine environment. A dredger can then easily fulfil all the necessary functions for the transport and the pumping.

The insertion of a mass A underneath the water surface creates the possibility of an improvement of the seabed, for example: stabilization that can eventually support a construction built later on the seabed.

The invention also relates to an apparatus, which is designed to carry out the method according to the invention. The apparatus comprises means for the displacement of the mass A, which comprises means for taking up mass A, means for the transport of mass A and means for the insertion of mass A under the surface.

The apparatus and the method according to the invention will further be explained referring to the drawings wherein embodiments of the invention are clarified.

DETAILED DESCRIPTION OF THE INVENTION

Figure 1:
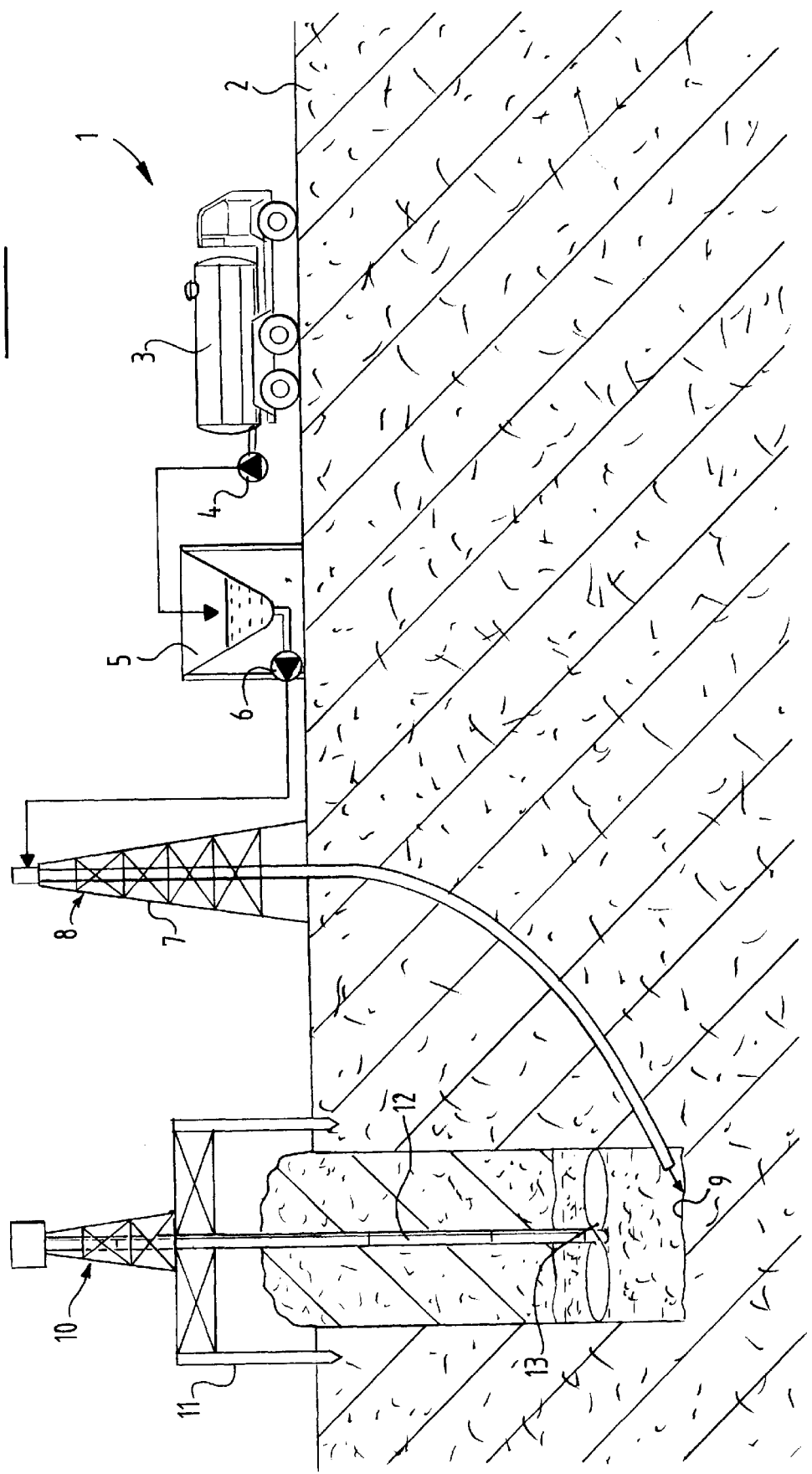
FIG. 1 a vertical sectional view of a preferred embodiment in an onshore application.

Referring to the drawings the numerial 1 indicates an arrangement for the vertical insertion or disposal of a mass A in a soil 2. Mass A is transported by lorry 3 and is tranferred through a pumping device 4 to a treatment unit 5, wherein several manipulations can be applied to the mass A. A treatment of a mass A is in particular preferable when the composition of a mass A can be improved or can be stabilized, for example incapsulated, before the mass A is inserted in the soil. The treated mass A will then be transferred via a high pressure pump 6 to a inserting device 8, which is provided with a pump and a piping-assembly which is connected to a frame 7. Mass A will then be inserted in a site (site B) 9 wherein a rotor 13 of a mixing device 10 preferably acts for the mixing of mass A with the adjacent soil masses (above named soil masses C and D).

A mixing device is not essential to the invention. The pressure force on mass A created by the pump device shall mix mass A to a certain extent with the adjacent soil masses C, D.

The mixing device 10 comprises a fixed frame 11 wherein a shaft 12 controls the rotor 13.

Due to the vertical insertion of a mass A and the upwards displacement of a soil mass C an upliftment can arise on the surface.

It is possible to use the mixing device 10 in a marine environment on for example a floating platform.

Figure 2:
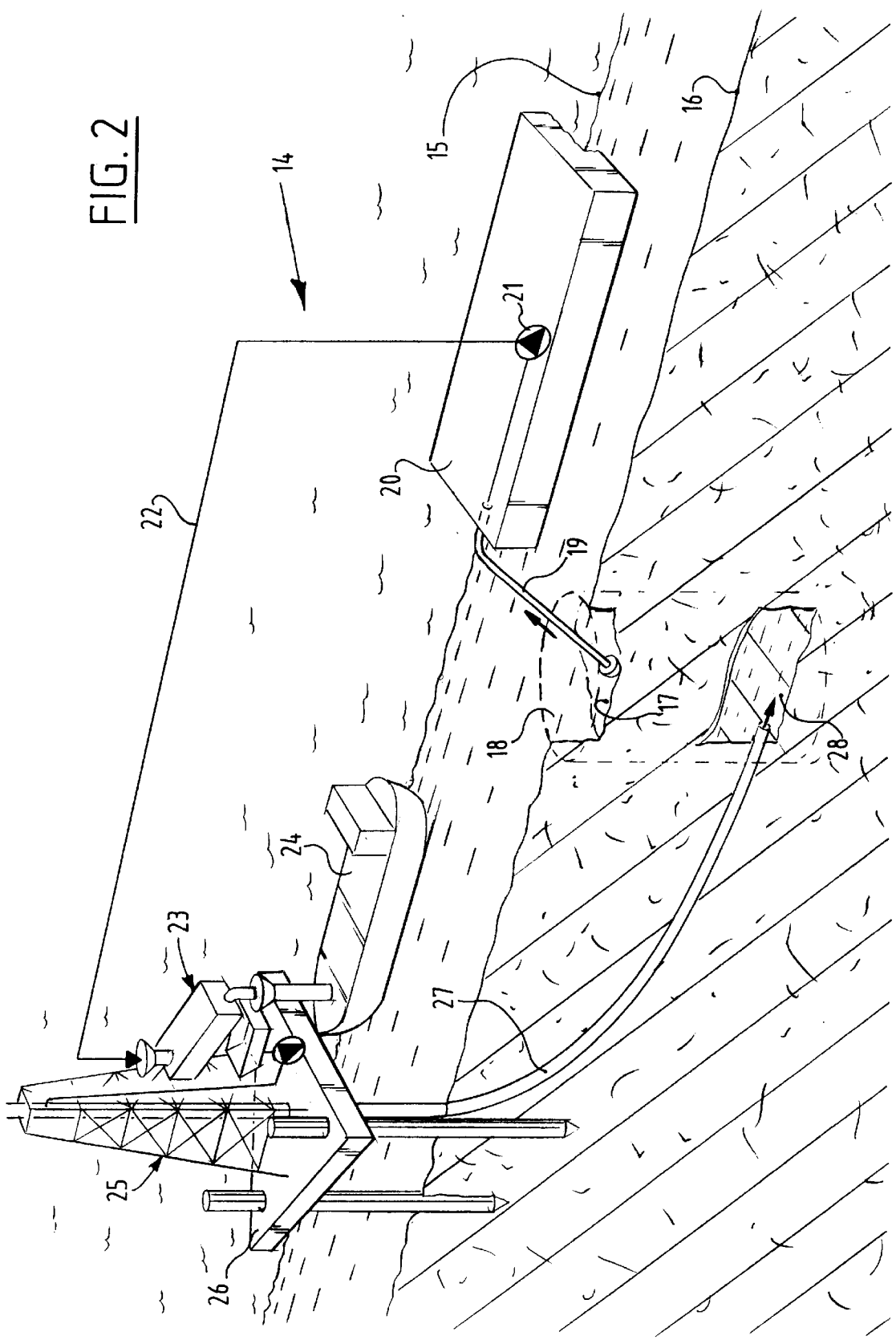
FIG. 2 a perspective, partially vertical sectional view of a embodiment in an offshore application.

FIG. 2 shows a device assembly 14 which is an embodiment in a marine environment. This arrangement 14 will then be used offshore, for example on a water surface 15 and in a bed 16 on the surface. Soil mass 17 (mass A) is in the first instance located on a site 18 on the surface of the seabed 16. The transfer of soil mass 17 will be carried out by use of a pumping device 21 on a platform 20 via pipe 19 and will be transported through pipe 22 to a treatment-unit 23.

After the treatment, the soil mass 17 can be transported to another location by way of a ship 24 or can be returned through a insertion device 25 which is located on a platform 26. Through pipe 27 the soil mass can be returned under its original site 18. This will finally cause the upliftment of the soil above 28 which will level off the seabed 16.

As it is an offshore application it is also possible to use a dredger-configuration, this dredger can fulfil all the necessary material transport and pumping functions.

An upliftment will then result in a new composition of the surface, which has preferably improved characteristics relating to the compactness, surface quality or stabilization of the soil surface.

It is obvious that the method according to the invention solves a disposal problem and meanwhile is also a solution for the improvement of the characteristics of the surface.

We claim:

1. A method for the displacement of mass A underneath the earth's surface and underneath a soil mass C to site B, whereby said method controls upliftment of soil mass C and substantially reduces or eliminates failure seams, comprising:
   (a) optionally treating mass A such that the composition of mass A is physically altered; and
   (b) inserting mass A underneath the earth's surface and soil mass C, without mechanically creating an empty cavity below soil mass C, such that soil mass C is displaced vertically upwards.

2. The method according to claim 1 wherein the inserting of mass A and the displacement of soil mass C is simultaneous.

3. The method according to claim 1 further comprising displacing a soil mass D positioned under site B, vertically downwards.

4. The method according to claim 1 further comprising after inserting mass A underneath the earth's surface and soil mass C, mixing mass A with soil mass C by use of a mixing device.

5. The method according to claim 2 further comprising after inserting mass A underneath the earth's surface and soil mass C, mixing mass A with soil mass C, soil mass D, or both.

6. The method according to claim 2 wherein the displacement of soil mass C and the displacement of soil mass D occurs simultaneously.

7. The method according to claim 1 wherein mass A is a soil mass.

8. The method according to claim 1 wherein site B is located underneath the initial position of mass A.

9. The method according to claim 1 wherein after the insertion of mass A, soil mass C forms a part of the earth's surface.

10. The method according to claim 1 wherein said method is carried out in a marine environment.

* * * * *

UNITED STATES PATENT AND TRADEMARK OFFICE
CERTIFICATE OF CORRECTION

PATENT NO. : 5,915,885
DATED : June 29, 1999
INVENTOR(S) : Philip L. Hermans, et al.

It is certified that error appears in the above-identified patent and that said Letters Patent is hereby corrected as shown below:

On the title page, item [30],

Foreign Application Priority Data

February 9, 1996    The Netherlands..................1002285

Signed and Sealed this

Twenty-sixth Day of September, 2000

Attest:

Q. TODD DICKINSON

*Attesting Officer*    *Director of Patents and Trademarks*